United States Patent
Sano et al.

(10) Patent No.: US 7,136,721 B2
(45) Date of Patent: Nov. 14, 2006

(54) ARTICLE MANAGEMENT SYSTEM AND ARTICLE MANAGEMENT APPARATUS

(75) Inventors: Kouichi Sano, Shizuoka-ken (JP); Nobuo Murofushi, Shizuoka-ken (JP); Yasuhito Kiji, Shizuoka-ken (JP); Yasuo Matsumoto, Shizuoka-ken (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 22 days.

(21) Appl. No.: 11/086,663

(22) Filed: Mar. 23, 2005

(65) Prior Publication Data

US 2005/0222707 A1    Oct. 6, 2005

(30) Foreign Application Priority Data

Apr. 2, 2004  (JP)  ............................. 2004-110210

(51) Int. Cl.
  *G06F 7/00*  (2006.01)
(52) U.S. Cl. ............ 700/215; 700/225; 340/5.92; 340/825.69
(58) Field of Classification Search ............... 700/213, 700/215, 225; 340/5.92, 10.51, 10.52, 572.1, 340/825.72, 825.69
See application file for complete search history.

(56) References Cited

U.S. PATENT DOCUMENTS

| | | | |
|---|---|---|---|
| 5,648,765 A | * | 7/1997 | Cresap et al. ............... 340/10.4 |
| 5,774,876 A | * | 6/1998 | Woolley et al. ................ 705/28 |
| 6,195,006 B1 | * | 2/2001 | Bowers et al. ............ 340/572.1 |
| 6,600,418 B1 | * | 7/2003 | Sainati et al. ............. 340/572.1 |
| 6,972,682 B1 | * | 12/2005 | Lareau et al. ............. 340/568.1 |
| 2002/0111819 A1 | | 8/2002 | Li, et al. |
| 2002/0170961 A1 | | 11/2002 | Dickson, et al. |
| 2003/0209601 A1 | * | 11/2003 | Chung ......................... 235/385 |
| 2003/0229417 A1 | | 12/2003 | Gyger et al. |
| 2004/0046642 A1 | | 3/2004 | Becker, et al. |
| 2005/0043850 A1 | * | 2/2005 | Stevens et al. .............. 700/213 |

FOREIGN PATENT DOCUMENTS

JP    2002-337827 A    11/2002

* cited by examiner

*Primary Examiner*—Khoi H. Tran
(74) *Attorney, Agent, or Firm*—Pillsbury Winthrop Shaw Pittman LLP

(57) ABSTRACT

There is provided an article management system having a plurality of article management apparatus that are arranged at the respective process stage position in a production line and read information by RF tag readers from an article RF tag affixed to each of articles contained in a case and a case RF tag attached to each of the cases. A server connected to the respective article management apparatus for managing ID information on the articles, quantity of the articles, current process stage positions for each of the cases and other items. With this system, production management for the articles contained in the cases can be performed in a short time without being interrupted, even if some of the tags have become damaged and reading from the tags is impaired.

4 Claims, 12 Drawing Sheets

| Case number | Quantity | Container number | Process stage position | Flag |
|---|---|---|---|---|
| No.10 | n | A1 | q | 1 |
| No.10 | n | A2 | q | 1 |
| No.10 | n | A3 | q | 0 |
| ⋮ | ⋮ | ⋮ | ⋮ | ⋮ |
| No.10 | n | An | q | 1 |
| No.11 | m | B1 | q | 1 |
| No.11 | m | B2 | q | 1 |
| No.11 | m | B3 | q | 1 |
| ⋮ | ⋮ | ⋮ | ⋮ | ⋮ |
| No.11 | m | Bm | q | 1 |
| ⋮ | ⋮ | ⋮ | ⋮ | ⋮ |

ARTICLE MANAGEMENT SYSTEM AND ARTICLE MANAGEMENT APPARATUS

CROSS REFERENCE TO RELATED APPLICATIONS

This application is based upon and claims the benefit of priority from the prior Japanese Patent Application No. 2004-110210 filed on Apr. 2, 2004, the contents of which are incorporated herein by reference.

BACKGROUND OF THE INVENTION (1) Field of the Invention

The present invention relates to an article management system and article management apparatus that manage, for example, an article manufactured in an automated factory while it is moving from one process stage position to another.

(2) Description of Related Art

The Japanese patent application Kokai publication No. 2002-337827 discloses an apparatus that manages mail articles by reading ID information of individual mail articles through an antenna of an RF ID tag interrogator that is made to approach or contact to a carrier case that contains plural mail articles each of which carries an RF tag storing ID information.

In this apparatus, if an RF tag attached to a mail article is damaged and becomes unreadable, this RF tag needs to be replaced with a reissued RF tag or to be treated separately from other mail article(s) carrying readable RF tags. It takes a lot of time to reissue a new tag or to manage only mail article(s) carrying unreadable RF tag(s) differently from others.

SUMMARY OF THE INVENTION

An object of the present invention is to provide an article management system that can perform production management in a shorter time for an article or articles that have become unreadable due to breakdown of RF ID tags attached to the articles in a production line where a case containing a plurality of RF-tagged articles is carried from one process stage position to another.

According to one aspect of the present invention, there is provided an article management system comprising an article carrying an article RF tag storing information pertaining to the article being manufactured and a label recording the article information, a case containing a plurality of such articles, a case RF tag that is attached to the case and stores at least a case ID information, a plurality of article management apparatus each disposed at a respective process stage in a production process for reading information through an RF tag reader from the article RF tags attached to articles within the case and the case RF tag attached to the case, and a server that is connected to the respective article management apparatus and manages the article IDs, a quantity of the articles, and a current process stage position for each of the cases using a database. The article management apparatus comprises a display, a transmitting means for transmitting information read by the RF tag reader, a display control means that, when the apparatus receives from the server a notice on an article, reading from which was failed, causes a reading-impairment instruction selection screen to be displayed on the display that urges an operator to determine whether or not to inform the sever of the impairment of reading from the article in question, and a reading-impairment notifying means for notifying to the server of the impairment of reading from the article in question when the operator selects the reading-impairment instruction over the reading-impairment instruction selection screen. The server comprises: a collating means, when the server receives from the article management apparatus information that the RF tag reader has read, for collating the received information with information read from the database in respect to article IDs, quantity, and process stage position relating to the relevant case; a transmitting means, when the collation has found an article from which reading was failed, that informs the article management apparatus of the article from which reading was failed; a setting means, when the server receives a notification from the article management apparatus of the impairment of reading from the article, for setting a status of "reading-impairment" as being so relating to the ID information of the article retained in the database.

BRIEF DESCRIPTION OF THE DRAWINGS

FIG. 11 displays an example of revised data contents in the database according to the first embodiment.

DETAILED DESCRIPTION OF THE INVENTION

Figure 1:
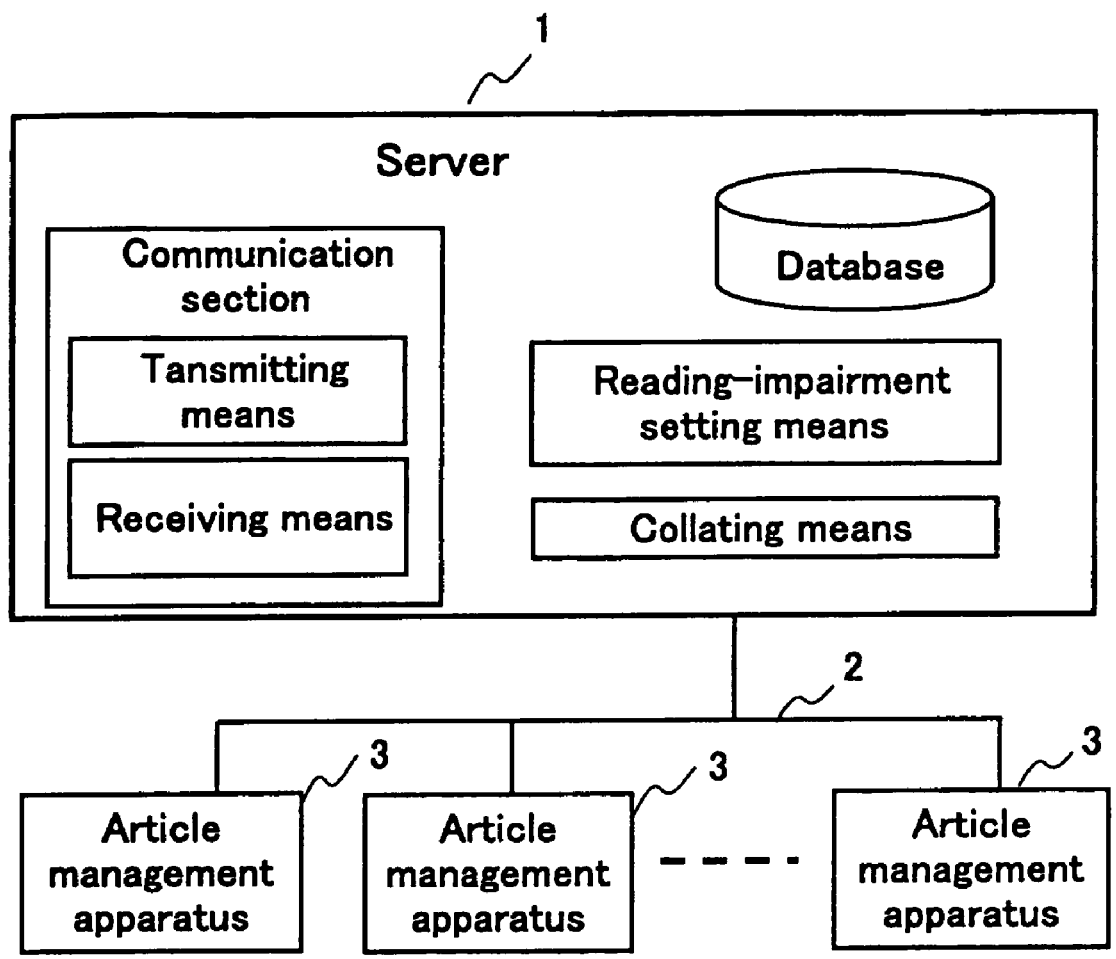
FIG. 1 is a block diagram of a structure of an article management system according to a first embodiment of the present invention.

Preferred embodiments of the present invention will now be described in more detail with reference to the accompanying drawings. However, the same numerals are applied to the similar elements in the drawings, and therefore, the detailed descriptions thereof are not repeated.

(First Embodiment)

FIG. 1 shows a structure of an article management system. A server 1 contains a database and is connected to a plurality of article management apparatus 3 over LAN 2. A number of article management apparatus 3 are disposed at respective process stage positions to manage a whole process in manufacturing articles. A server 1 collects information that the respective article management apparatus 3 manage at the respective process stage positions, and stores the collected information in the database.

Figure 2:
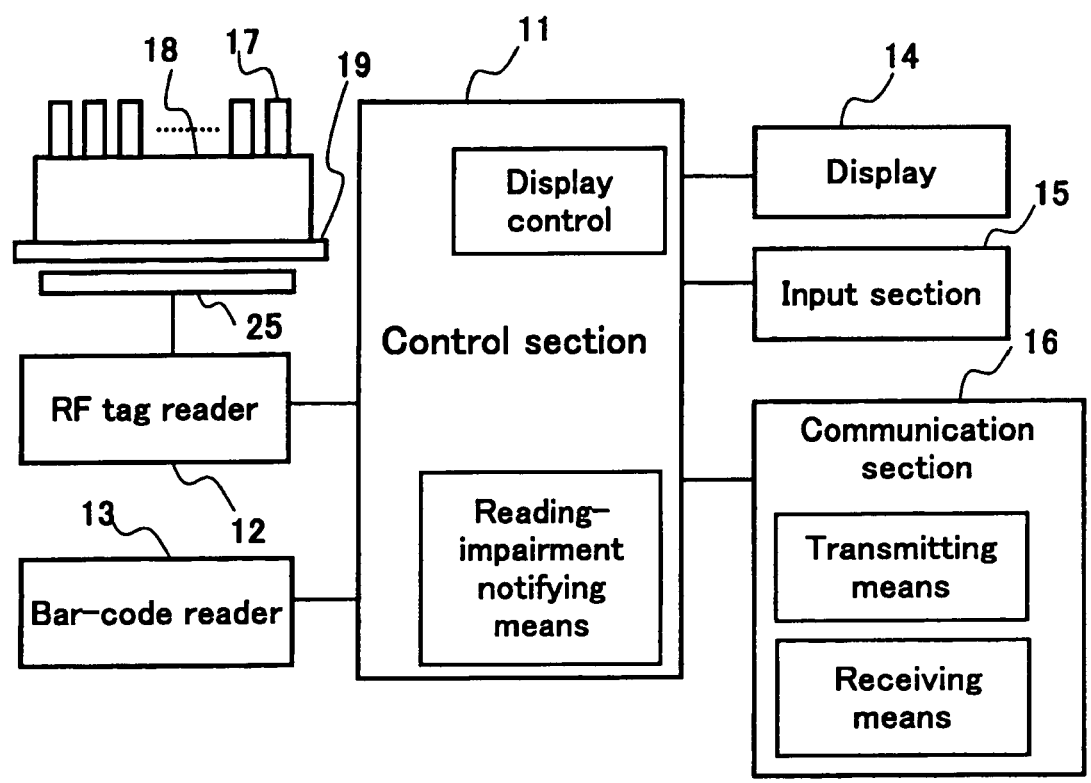
FIG. 2 is a block diagram of a structure of an article management apparatus according to the first embodiment.

As shown in FIG. 2, article management apparatus 3 comprises a control section 11 that controls the whole apparatus, an RF tag reader 12, a handy-type bar-code reader 13, a display 14, and a communication section 16 having a transmitting means and receiving means for communicating with an input section 15 and server 1. Control section 11 comprises a microprocessor, a memory, a display control means, a reading-impairment notifying means, etc., and serves to operate the respective functional sections according to programs.

A product container 17 containing, for example, personal ornaments is used as an article. An operation at each process stage position is carried out by unit of a case 18 that contains a plurality of product containers 17. An operator places a case 18 that is conveyed from a former process stage position on a loading board 19 provided in the article management apparatus. An operator at each process stage position takes out one product container 17 from case 18, picks up production articles from product container 17, and works upon the articles as required. Then, he or she puts the worked articles back into product container 17 and returns product container 17 to case 18. When all necessary works for all product containers 17 within case 18 are completed, case 18 is shifted to a next process stage position.

Figure 3:
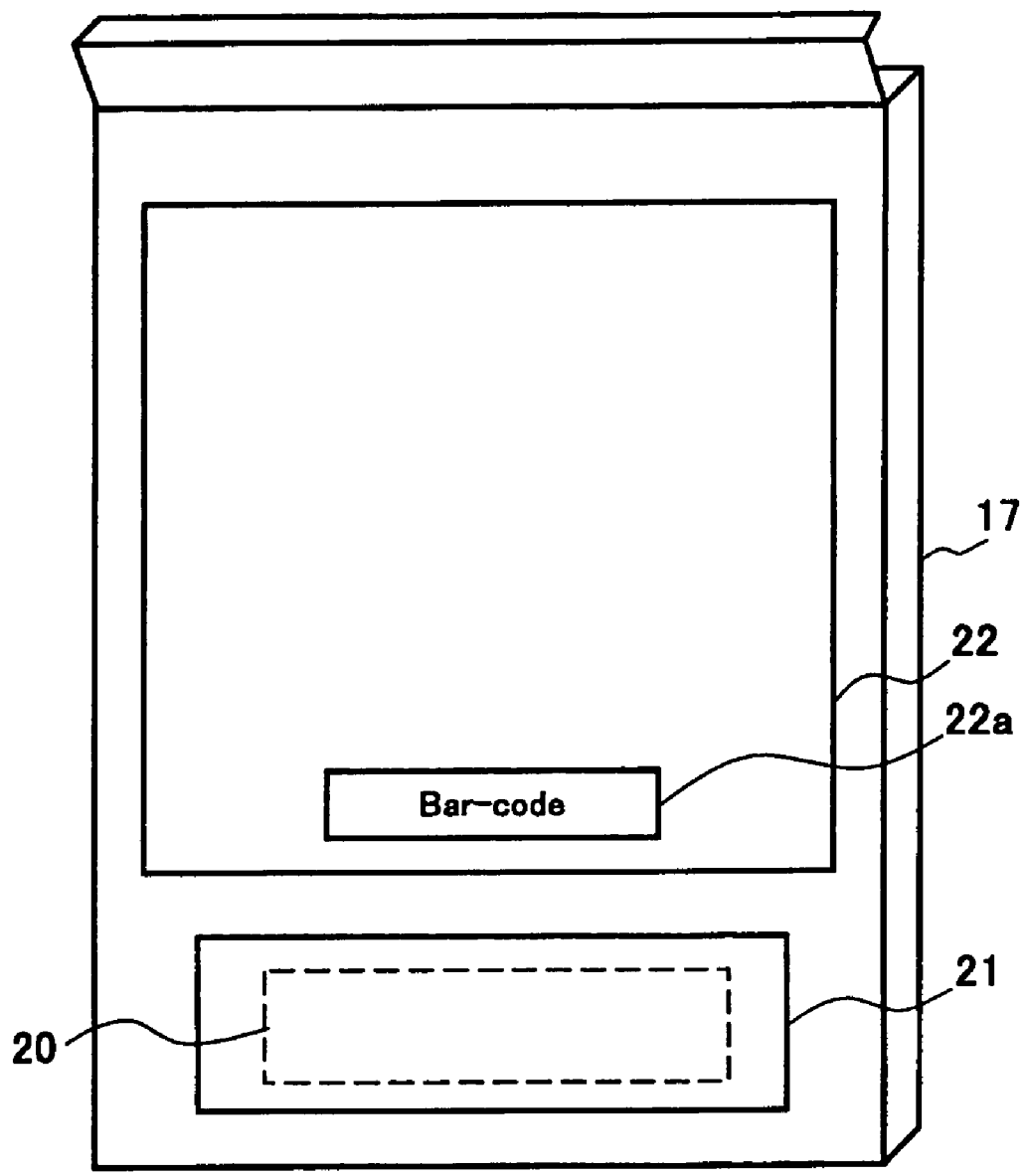
FIG. 3 shows a structure of a product container according to the first embodiment.

As shown in FIG. 3, product container 17 is a box, and is provided with a pocket 21 in the lower part on its outer surface to hold an article RF tag 20 storing a container number. Article RF tag 20 can freely go in and out of pocket 21. On the upper surface of the container, there is affixed a label 22 that holds a record of information on the production articles contained in product container 17. The container number of product container 17 is recorded also as a bar-code 22a on this label.

Figure 4:
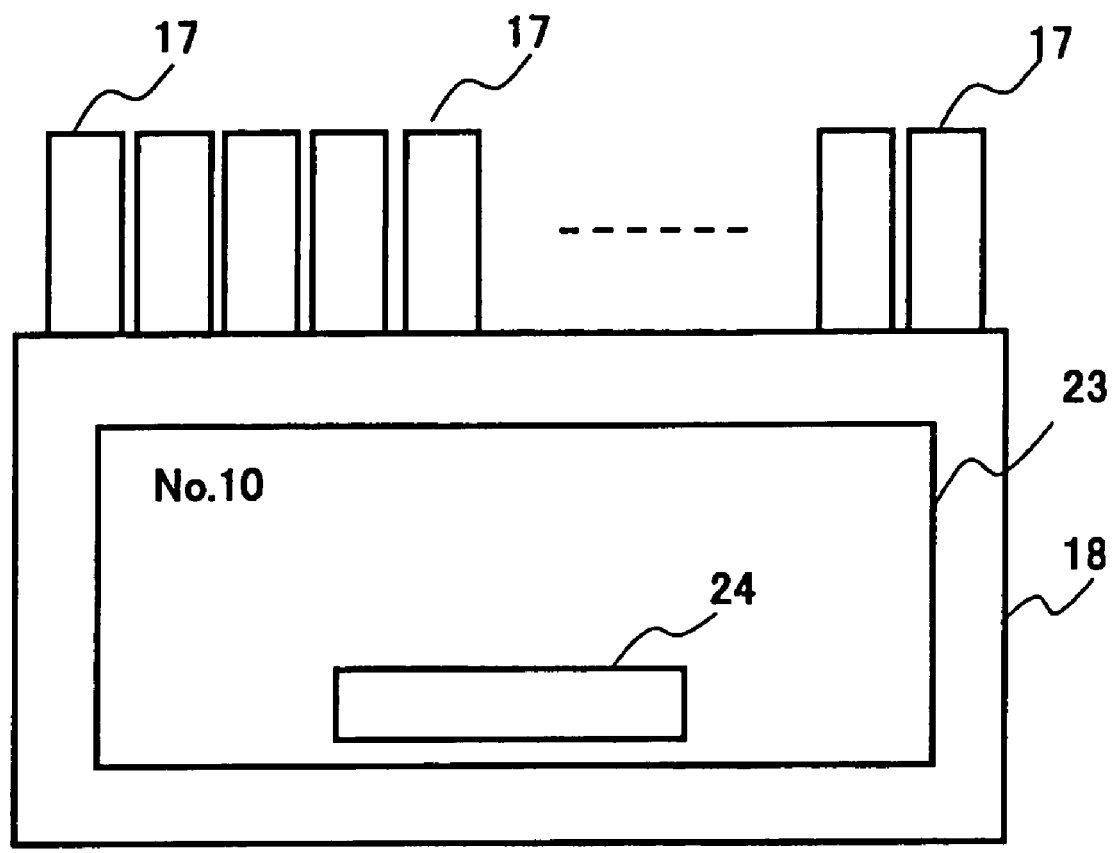
FIG. 4 shows a structure of a case according to the first embodiment.

As shown in FIG. 4, case 18 has a size enough to contain a number of product containers 17 that are arranged lengthwise. On its outer surface a case label 23 indicating a case number is affixed. In this example, the case number is No. 10. To identify case 18, a case RF tag 24 storing a case number is attached to this case label 23.

An RF tag reader 12 reads through an antenna 25 a case number from case RF tag 24 and a container number from article RF tag 20 affixed to each of product container 17 in a state that case 18 is placed on loading board 19.

Figure 5:
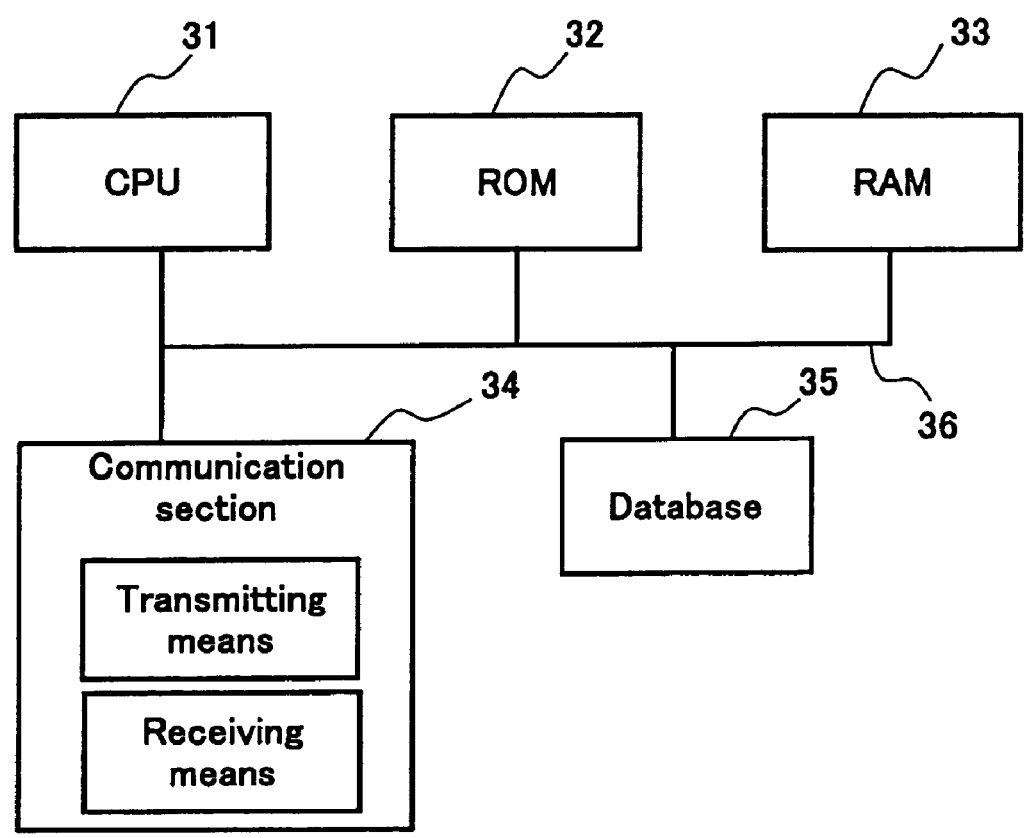
FIG. 5 is a block diagram of a structure of a server according to the first embodiment.

As shown in FIG. 5, server 1 includes a CPU (Central Processing Unit) 31 that constitutes the body of the control section, a ROM (Read Only Memory) 32 that stores programs by which CPU 31 controls the respective operational sections, a RAM (Random Access Memory) 33 storing data that CPU 31 uses to process, a communication section 34 for communicating with the respective article management apparatus 3 over LAN 2, and a database 35. They are mutually connected through a bus line 36. As shown in FIG. 1, server 1 comprises a collating means, a reading-impairment setting means, and a communication section consisting of a transmitting means and a receiving means for communicating with the respective article management apparatus.

Figure 6:
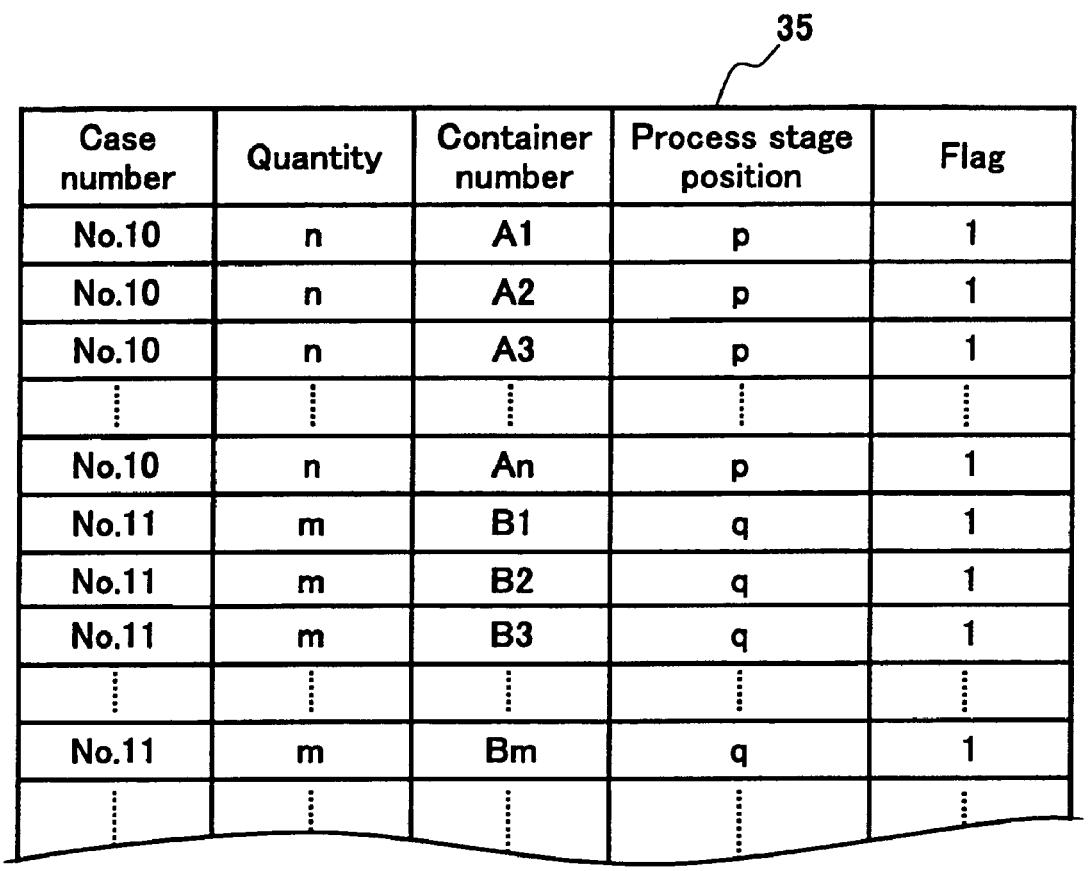
FIG. 6 displays an example of memory contents in a database according to the first embodiment.

As illustrated in FIG. 6, database 35 holds information on cases 18 disposed at the respective process stage positions, that is, case numbers, quantities of product containers 17 in the respective cases 18, container numbers, process stage positions where the respective cases are currently positioned, and RF tag flags indicative of current statuses of RF tags. The RF tag flag "1" indicates "readable," "0" indicates "unreadable," and "9" indicates "loss of RF tag," that is, a loss of the product container. FIG. 6 indicates that case No. 10 holds n product containers 17 whose container numbers are A1 though An, positioned at process stage position p, and all RF tags of the product containers 17 are in a "readable" state.

Figure 7:
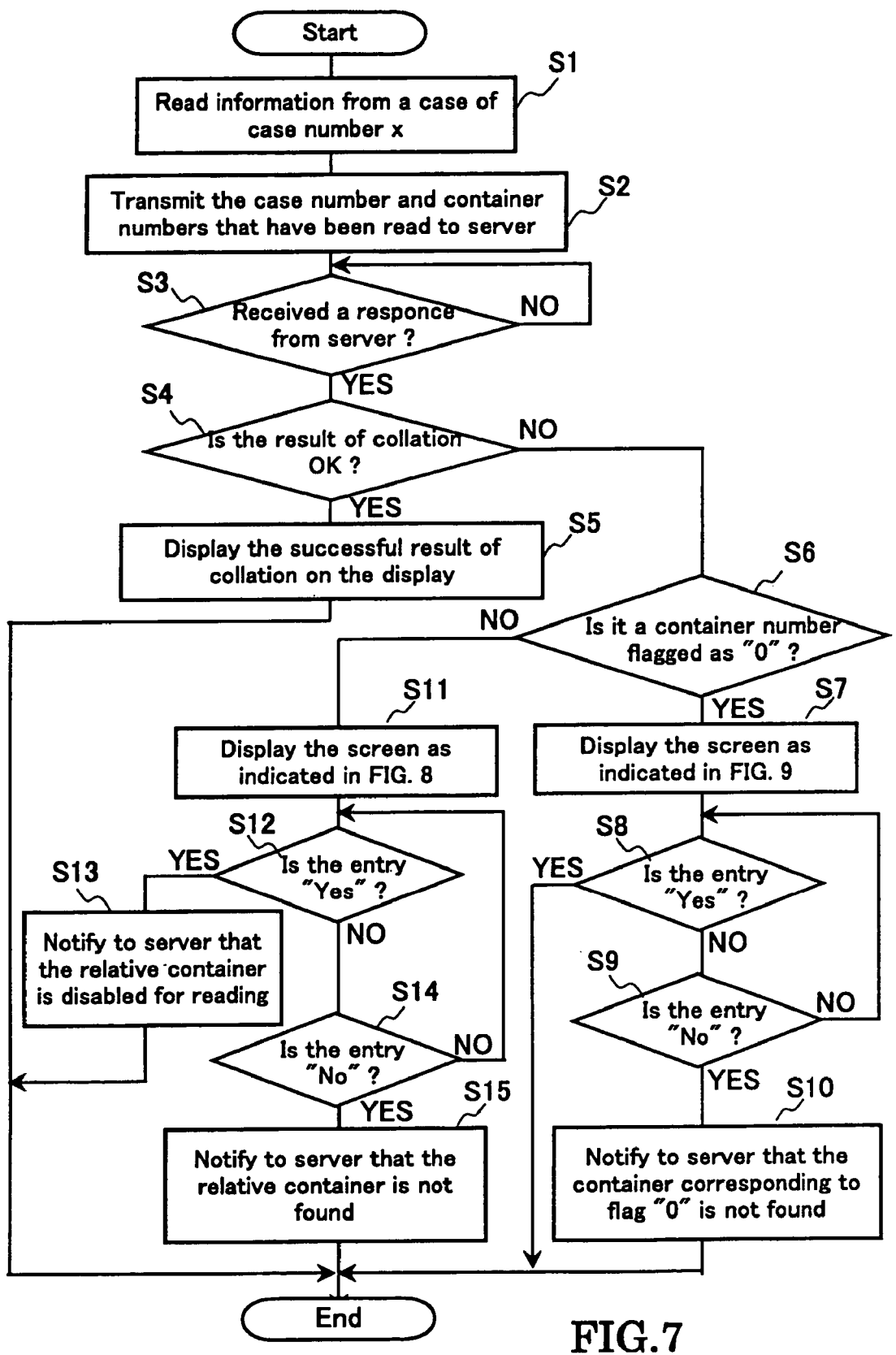
FIG. 7 is a flowchart illustrating principal processing in a control of the article management apparatus according to the first embodiment.

When case 18 is placed on loading board 19, control section 11 of each article management apparatus 3 installed at the respective process stage position performs the processing as described in FIG. 7. First, RF tag reader 12 reads a case number from case RF tag 24 on the case 18 through antenna 25 and container numbers from article RF tags 20 affixed to the respective product containers 17 contained in the case 18 (S1). The case number and container numbers that have been read are stored in the memory of the article management apparatus and sent to server 1 through communication section 16 (S2). After transmitting the case number and container numbers to the server, the article management apparatus 3 idles until it receives a result of collation for the numbers from server 1 (S3). Server 1 then compares the case number and container numbers within the case that have been read by the relevant article management apparatus to case number and all container numbers in the database related to the case number received, and transmits the result of the comparison to the relevant article management apparatus. The relevant article management apparatus then performs the following operations based on the result of the comparison.

If all the case number and container numbers that the article management apparatus has read have been found to correspond to the data retained in the database and all flags of those RF tags are "1" (S4), a message "Result of the collation is OK" appears on display 14, and the flow process terminates (S5).

If there is any container(s) whose associated flag is "0" among those in the database related to the case number, or if any of the case number and container numbers that the article management apparatus has read is found not to conform to the data retained in the database, the following operation is performed (S4).

Figure 8:
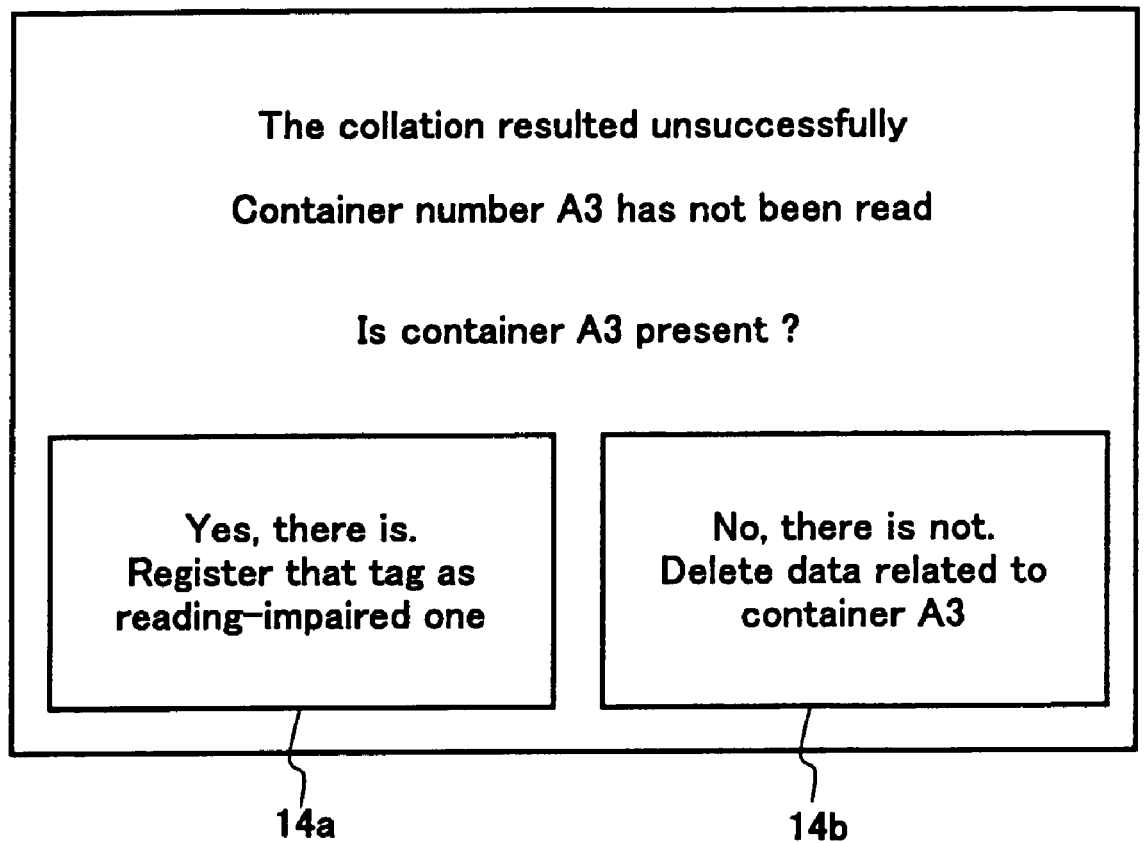
FIG. 8 illustrates an example of a screen on a display of the article management apparatus according to the first embodiment.

When the article management apparatus receives a notice on a container number from server 1 that the flag of the RF tag is "1" and the article management apparatus failed to read at current stage position, the screen as in FIG. 8 is displayed on display 14. Although it is not shown in FIG. 7, before the screen as in FIG. 8 is displayed, control section 11 may retry reading from RF tags 24 and 20 by RF tag reader 12 and transmit the reading result to server 1. The reading may also be repeated a predetermined times while the operator adjusts the position of case 18 on loading board 19. If the reading has been successfully made, the process may proceed accordingly.

In FIG. 8, the screen on the display indicates messages of "The collation resulted unsuccessfully," "Container labeled "A3" has not been read," "Is container A3 present?; and further, it displays a button 14a saying "Yes, there is. Register RF tag of the container as one that is disabled to read from," and a button 14b saying "No, there is not. Delete data pertaining to container No. A3 in case No. 10." The apparatus idles waiting until the operator presses a button of either "Yes" or "No."

An operator at the article management apparatus 3 observing contents of this display checks whether or not the container indicating "container number A3" exists looking at recorded label 22 of the product container 17 in question. The operator then clicks on click button 14a of "Yes," if he or she finds the product container in question within the case 18 (S12); or click button 14b of "No," if he or she finds none of the product container in question within the case 18 (S14).

When the operator enters "Yes," the article management apparatus notifies server 1 that article RF tag 20 of the product container 17 in question is disabled for reading (S13). The state as in this case that, although the product container 17 in question exists in the case 18, the relevant container number is unable to read because of breakdown of its attached article RF tag 20 is referred to as a state of "reading-impairment." This flow process then terminates.

When the operator enters "No," the article management apparatus notifies server 1 that the product container 17 in question cannot be found in the case 18 (S15). Then, this flow process terminates.

Figure 9:
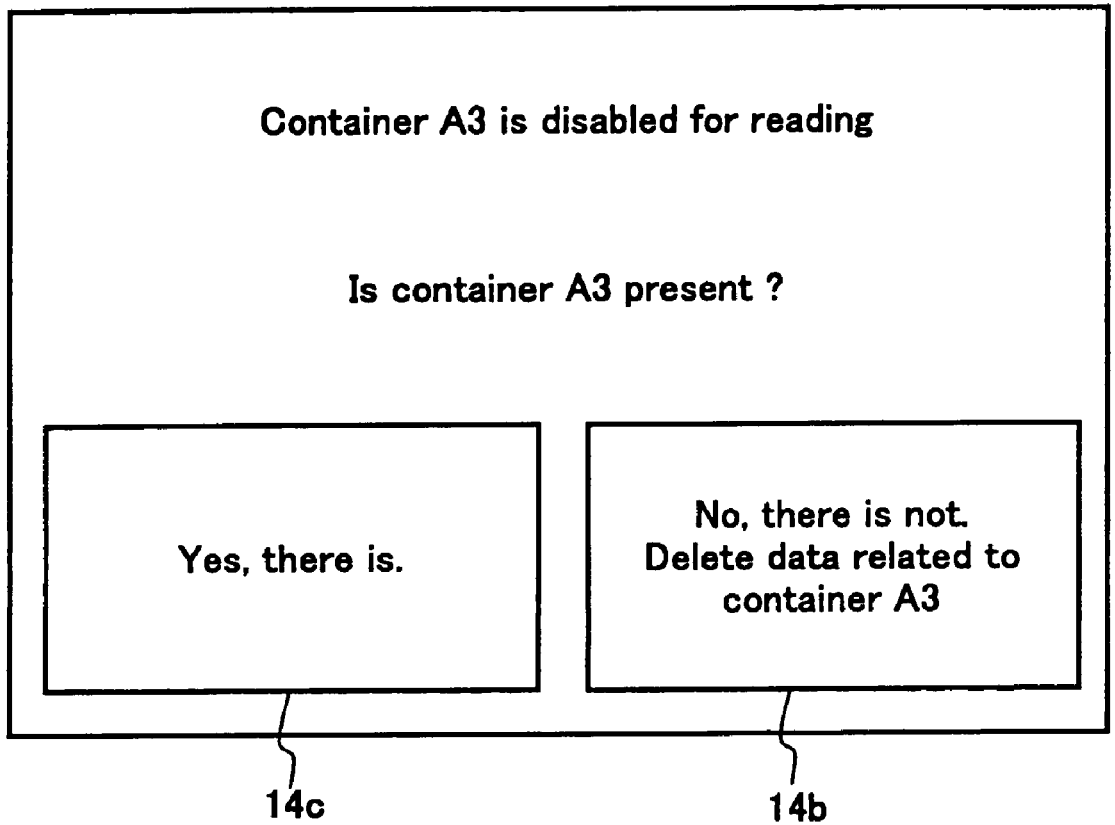
FIG. 9 illustrates an example of another screen on the display of the article management apparatus according to the first embodiment.

Assuming that an RF tag attached to a product container 17 in the case 18 was found disabled for reading at the previous process stage position, flag of that RF tag of the container is to have been changed to "0." If this particular product container 17 would be carried to the current process stage, server 1 should notify the relevant article management apparatus thereat that this product container 17 with RF tag flag "0" should be present in the relevant case 18. Having received this notice, the relevant article management apparatus displays to display 14 as indicated in FIG. 9 (S6, S7). This screen shows an example of the case that RF tag flag affixed to container No. A3 in case No. 10 is set to "0."

In FIG. 9, the screen on the display indicates messages of "Container labeled "A3" is disabled for reading," "Is container A3 present?," and further, it displays a button 14c indicating "Yes, there is." and a button 14b indicating "No, there is not. Delete data related to container No. A3 in case No. 10." The apparatus then idles waiting until the operator presses a button of either "Yes" or "No."

If the button saying "Yes, there is." is clicked (S8), the processing terminates without any further actions, since the RF tag flag in the database 35 associated with the product container 17 that the apparatus failed to read from has already been set to "0." Herein, since the container number of the product container 17 is recorded as a bar-code 22a on its label 22, the container number can be known by reading the bar-code 22a by a bar-code reader. Accordingly, the operator needs no further actions, such as a task of issuing a new RF tag, management work for product containers 17 in the production process can be achieved in a short time.

If the button saying "No, there is not." is clicked (S9), since the product container 17 in question is already removed from the case 18, the reading-impairment notifying means notifies server 1 that the product container 17 associated with RF tag flag "0" is not present (S10). Then, this flow process terminates.

(Operation of Server)

Figure 10:
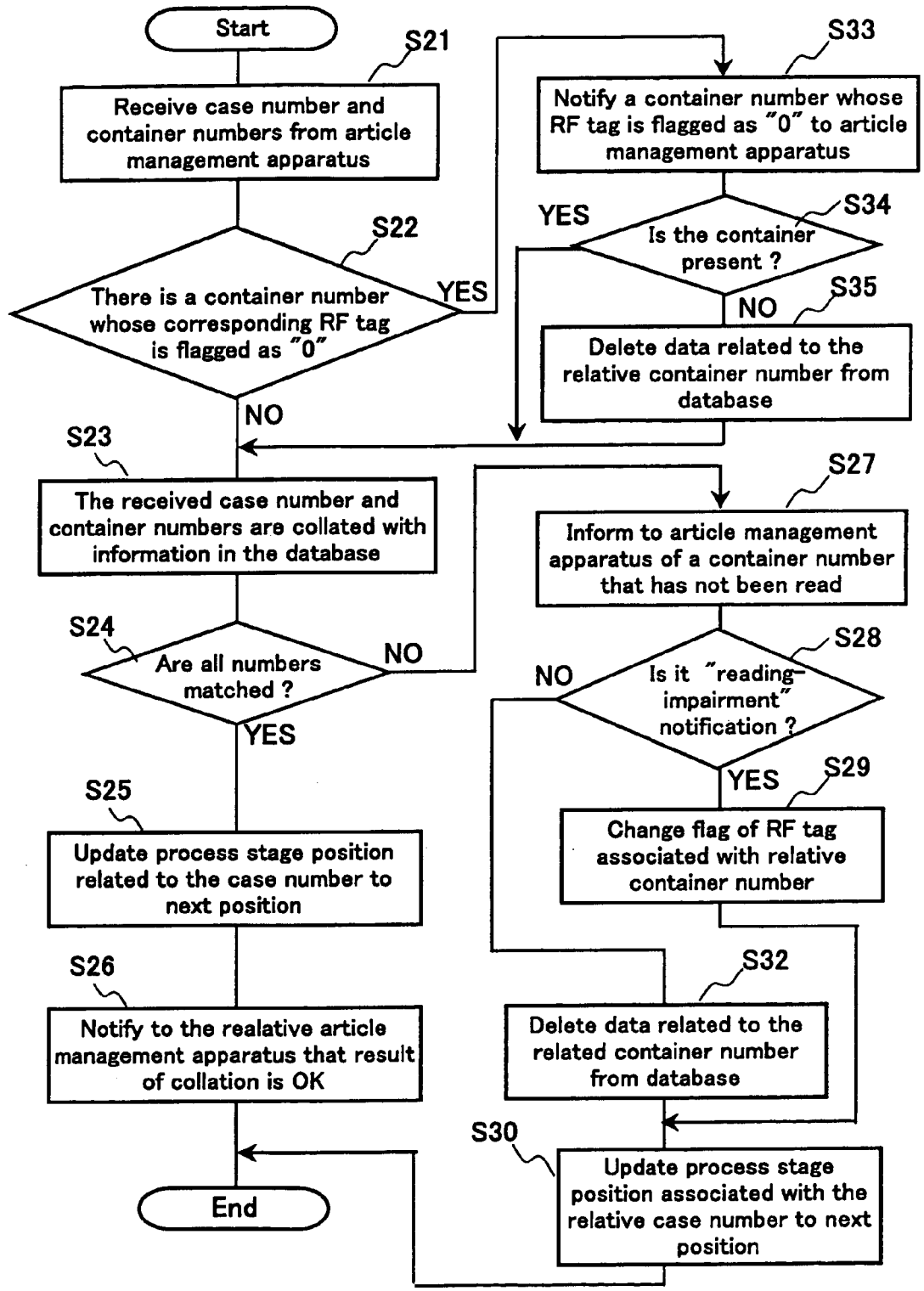
FIG. 10 is a flowchart illustrating principal processing in the server according to the first embodiment.

Server 1 operates as described in FIG. 10. First, it receives from article management apparatus 3 a case number of case 18 and container numbers of product containers 17 contained in the case (S21). Then, the server examines all RF tag flags associated with the corresponding container numbers in the database 35 to see if there is any product container whose container number has been changed to "0" in the previous process stage (S22).

If all the RF tag flags are 1s, the received case number and the respective container numbers are collated with the corresponding data in the database 35 (S23). If the received case number and all of the container numbers conforms to (corresponding) data in the database 35 (S24), all of the case and containers are judged as having no problems in terms of a damage of RF tag or loss of the product containers. Then, the flow process proceeds to step S25, where a process stage position associated with the case number in the database 35 is changed to a current process stage position. In the example shown in FIG. 10, the process stage position of case number 10 is changed from the previous process stage position p to the current process stage position q. After this change of the process stage position, server 1 informs of the acceptable result of collation to the relevant article management apparatus 3 (S26). The flow process terminates here.

If, of container numbers of the case number in the database corresponding to those received, there is any container number whose associated RF tag flag is changed to "0" (S22), that container number with RF tag flag "0" is transmitted to the related article management apparatus 3 (S33). Then, server 1 waits for responding from the article management apparatus 3 (S34). The article management apparatus 3 displays the received container number with RF tag flag "0" on the display 14. FIG. 9 displays a screen of the case that the RF tag of container number A3 is flagged as "0." In this screen, there are displayed a click button 14c indicating "Yes, there is." and a click button 14b indicating "No, there is not. Delete data related to the container number A3 within case No. 10". The operator operating this article management apparatus checks if the product container bearing container No. A3 is present within case 18, based on information indicated on its label affixed thereto. Then, he or she clicks on the button of "Yes," if the container is found; or the button of "No," if it is missing thereat.

When the operator selects "Yes, there is." finding the product container bearing "container number A3," server 1 in a state of "waiting" receives from the article management apparatus 3 a notice that there exists the product container labeled "A3" with RF tag flag "0" within the case (S34). In the case the product container in question exists within the case, the process proceeds to step S23, where the case number and the respective product containers that were received are collated with data related to the relevant case number in the database 35. Thereafter, the same operations as in the case of all RF tags flagged as "1" are made.

When the operator selects "No, there is not." failing to find the product container bearing "container number A3," server 1 in a state of "waiting" receives from the related article management apparatus 3 a notice that the product container A3 having an RF tag flag "0" does not exists within the case (S34). In the case that the product container does not exist within the case, server 1 deletes from the database data related to the relevant product container of the case number, that is, case number, quantity, container number, process stage position, and RF tag flag (S 35). Then, the flow process proceeds to step S23, and the same operations as in the case of all RF tags flagged as "1" are made.

In the case that the case number and the respective container numbers that are received do not conform to corresponding data in the database 35 (S24), there is a possibility that within a plurality of the product container 17 there would be a container from which its number could not be read and the RF tag of that product container was damaged or the container was missing. In this case, server 1 informs the relevant article management apparatus 3 of that container number in question (S27). In the case that server 1 receives again the case number and related container numbers from the article management apparatus 3, the collation may be successively carried out, although this practice is not shown in FIG. 8 or 10.

After server 1 sends a container number that could not be read to the article management apparatus 3, the relevant article management apparatus 3 then displays the screen as shown in FIG. 8 on display 14. On the display of the relevant article management apparatus 3, click button 14c saying "Yes, there is," and click button 14b saying "No, there is not. Delete data related to container number A3 within case No. 10" that urge the operator to select either one from them are displayed. The operator clicks on one of the messages "Yes" and "No," and server 1 receives the respondence from the article management apparatus 3.

If the product container in question exists in the case, server 1 receives the message (14c) "Yes, there is." (S28). In this case, since the article RF tag 20 of the product container 17 in question is disabled for reading, a setting means for setting "reading-impairment" changes an RF tag flag associated with the product container number within the case from "1" to "0" (S29). Thereafter, all the process stage positions annexed to the relevant case number in the database 35 are changed (S30), and this flow process terminates. In this example, as shown in FIG. 11, the RF tag flag of the product container number A3 in the case number 10 in the database 35 is changed from "1" to "0."

If the product container in question does not exist in the case, server 1 receives the message (14b) "No, there is not." from the article management apparatus 3 (S28). In this case, since the product container 17 in question is missing, data related to the product container number in the case, that is, the case number, quantity, process position, and annexed RF tag flag are removed from the database 35, and the quantity of the product containers within the case is reduced from "n" to "n-1." (S32). Thereafter, all the process stage positions of the case in the database 35 are changed (S30), and this flow process terminates.

In this structure, case 18 containing a plurality of product containers 17 each of which carries article RF tag 20 moves from one process stage position to the next, while articles contained in the respective product containers 17 are being worked. The database 35 in server 1 previously stores information as to which case contains what types of product containers, how many they are, and others. By communicating with the respective article management apparatus 3, the database 35 also manages information as to which case is situated at which process stage position and whether or not readings from article RF tags 20 affixed to the respective product containers 17 are being performed.

For example, when case 18 is carried-to process stage position q from the previous process stage position p, an operator at article management apparatus 3 places the case 18 on loading board 19 and operates the apparatus. The article management apparatus 3 reads a case number from case RF tag 24 affixed to the case 18 and container numbers from article RF tags 20 affixed to the respective product containers 17 though RF tag reader 12. The apparatus then transmits the case number and container numbers that have been read to server 1 over LAN 2.

Server 1, which has received the case number and container numbers, first searches container numbers in database 35 related to the case number received to see if there is any container number among them that is flagged as "0." If all the RF tags are flagged as "1," then server 1 checks if all of the corresponding case number and container numbers that are previously stored in the database 35 matches those in the case number received.

If the examination has confirmed that all of the corresponding case number and container numbers that are previously stored in the database 35 matches those in the case number received, a process stage position associated with the case number is revised from the previous process stage position p to current process stage position q. The relevant article management apparatus 3 is informed of the successful result of the collation. The relevant article management apparatus 3 received this collation result displays the result to display 14 to notify it to the operator.

If any container number is found missing out of relevant container numbers retained in the database by collating the container numbers received with those in the database 35, the relevant article management apparatus 3 is to be informed that that particular number missing could not be read. The relevant article management apparatus 3 received this information displays it on display 14 as shown in FIG. 8. Seeing this display, the operator adjusts a position of the case 18 on loading board 19, or tries to remedy the reading. If the missing container number becomes readable by this action, the process proceeds as the collation has been made successfully.

However, if any container remains missing, the relevant article management apparatus 3 displays as shown in FIG. 8. Alternatively, before displaying this screen, reading by the article management apparatus 3 and transmission of the read data to server 1 may be reiterated seeking successful reading, although it is not shown in FIGS. 8 and 10. Having seeing this display, the operator checks labels 22 of the product containers contained in the case 18 to see if the container having the missing container number exists. If the missing container is found, the operator clicks on the click button 14c saying "Yes, there is." displayed on display 14.

Since the product container 17 in question is thereby seen to exist, the relevant article management apparatus 3 notifies server 1 that reading from RF tag of the container in question is impaired. Receiving this information, server 1 changes the RF tag flag annexed to the product container 17 in question retained in database 35 from "1" to "0." Then, the process stage position associated with the corresponding case number is changed from the previous process stage position p to the current process stage position q. For example, if the container number of product container 17 whose RF tag is disabled for reading is A3, contents of database 35 is changed as illustrated in FIG. 11.

As described above, server 1 manages the production such that, when an article RF tag 20 has become disabled for reading, the RF tag flag of a container number related to the disabled RF tag is changed to "0." Since, when an RF tag flag is "0," the product container 17 in question exists in the case 18, the product container 17 in question can be moved as being contained in the case 18 between process stage positions as well. In this manner, even when an RF tag becomes unreadable, it does not need to issue a new tag or treat it separately from others. Thus, a time for managing a product container having an impaired RF tag can be minimized. Presence or lack of product container 17 whose RF tag becomes disabled for reading in the case can be examined thereafter by reading a bar-code 22a recorded on label 22 by a bar-code reader 13.

In the case that the product container bearing the container number that is missing is not found in the case 18, the operator clicks on click button 14b saying "No" displayed on display 14. The relevant article management apparatus 3 thereby informs server 1 that product container 17 in question does not exist in case 18. Server 1 that has received this message deletes data related to this product container 17 retained in database 35, and subtracts 1 from the quantity within the case. Subsequently, the process stage position associated with the case number is changed from the previous position "p" to the present position "q."

Since, in the case that database 35 controls in this manner product container 17 that does not exist in case 18, the data related to the missing container 17 is removed from database 35, it does not need to search this missing product container 17 again thereafter and managing for the remaining product containers 17 in the case 18 can be continued.

In addition, in the case that there is a product container 17 having a container number whose annexed RF tag flag is changed to "0" in database 35, the relevant article management apparatus 3 first reads case RF tag 24 and article RF tags 20 when case 18 is placed on loading board 19, informing server "1" of the case number and container numbers that have been read. Then, it receives from server "1" the relevant container number whose RF tag is flagged "0" and displays it on display 14 making the operator know it. Thereby, the operator can know, before commencing his/her work, existence of the product container 17 having a reading-impaired article RF tag 20 and which one it is.

(Second Embodiment)

Article management apparatus 3 in the second embodiment is provided with RF tag reader/writer in place of RF tag reader 12 in the first embodiment. This RF tag reader/writer stores data including a case number, container numbers 17, quantities, process stage positions, RF tag flags, etc. in case RF tag 24 affixed to case 18. In this structure without using a server, to manage product containers 17 within the case, article management apparatus 3 disposed in each of process stage positions transmits and receives only to/from case RF tag 24.

The structure of this article management apparatus 3 according to the second embodiment is identical to one shown in FIG. 2, except that the RF tag reader in the FIGURE is replaced with an RF tag reader/writer. Control section 11 of article management apparatus 3 performs processing as described in the flowchart in FIG. 12. The RF tag reader/writer first reads container numbers (first container number data) of the respect product containers 17 each carrying article RF tag 20 within case 18, and the read data is stored in the memory within article management apparatus 3 (S41). Thereafter, the RF tag reader/writer reads a case number, the respective container numbers (second container number data), process stage positions, and RF tag flags, all of which are stored in case RF tag 24, and these data are also stored in the memory within article management apparatus 3 (S42).

The data stored in case RF tag 24 is examined to see if there is any container number flagged as "0" (S43) in it. If any container whose RF tag is flagged as "0," exists, the screen as shown in FIG. 9 is displayed (S44). Seeing this screen, the operator checks the record of labels of product containers 17 to see if there is a product container indicating that container number, and clicks on click button 14*c* saying "Yes" if the product container 17 in question is found in case 18; or 14*b*saying "No," if the product container 17 in question is not found therein.

If "Yes" is selected (S45), the flow process proceeds to S48 without performing any operation. If "No" is selected (S46), the RF tag reader/writer is controlled to delete data related to that container number stored in case RF tag 24 (S47). Then, the flow process proceeds to S48.

In the case that all of the RF tag flags in the data stored in case RF tag 24 are is, that is, there is no container number flagged as "0" (S43), the flow steps to S48.

Then, the first container number data that is read from article RF tag 20 of the respective product containers 17 is compared with the second container number data read from case RF tag 24 (S48). If the first container number data and the second container number data conform to each other in all respective numbers (S49), the process stage position stored in case RF tag 24 is revised from the previous process stage position to the current process stage position (S50) as the control has judged that everything is alright. Then, the successful collation result is displayed on display 14 (S51), and the process terminates.

If there is found a container number that could not be read (S49), the screen as shown in FIG. 8 is displayed on display 14 (S52). As an option, before displaying the screen as in FIG. 8, retries of reading for the container in question may be made. If a successful result is obtained by the retries, the process control can advance as the reading is alright (not shown in FIGS. 8 and 11). Having seen this display, the operator at the relevant article management apparatus 3 examines contents of the record on label 22 of the product container 17 in question to see if the product container 17 having the container number in question really exists in the case 18. Then, the operator clicks on button "Yes" (14*a*), if the product container in question is found in the case 18; or button "No" (14*b*), if not.

Figure 12:
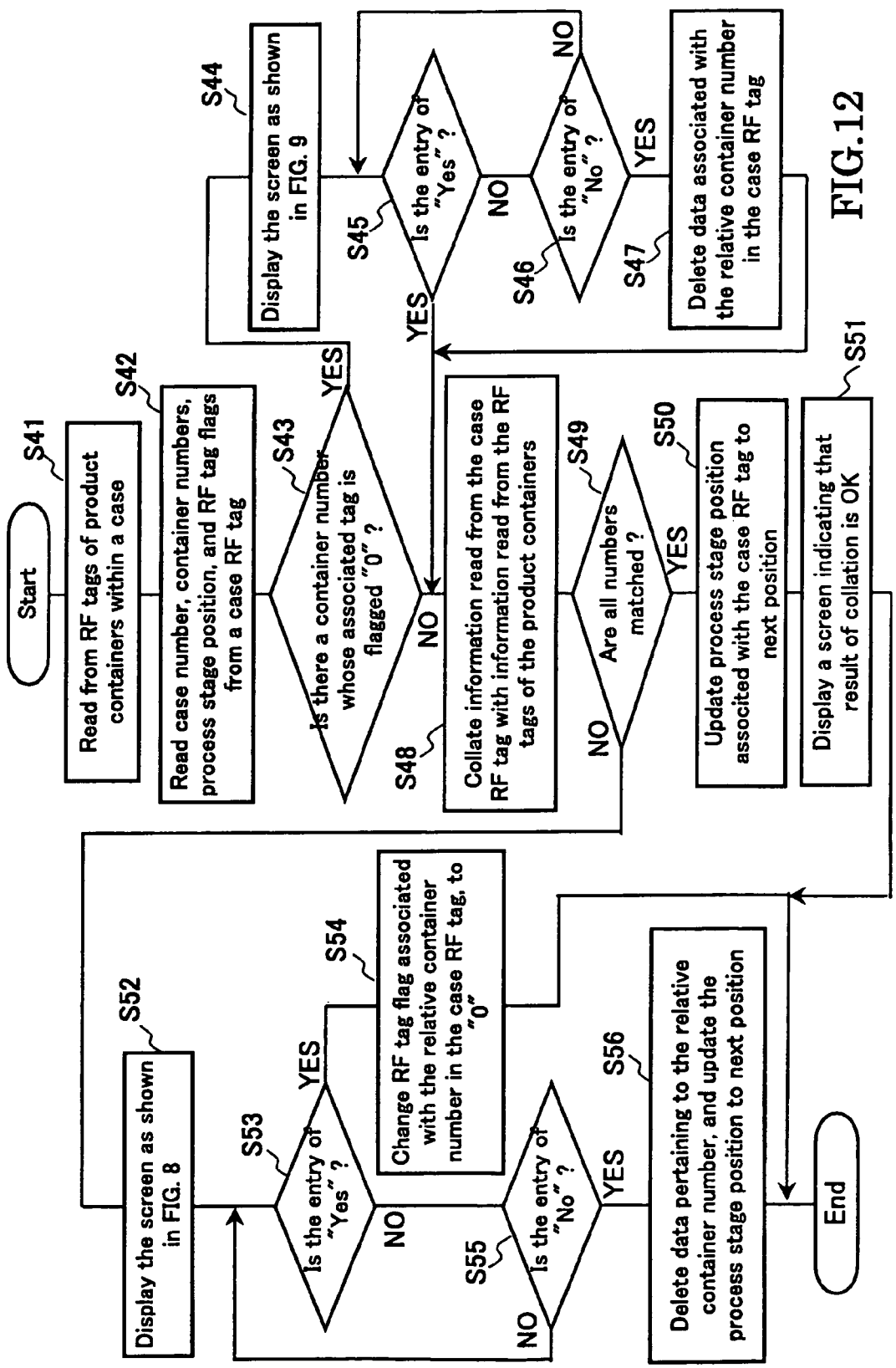
FIG. 12 is a flowchart illustrating principal processing in the control of the article management apparatus according to a second embodiment of the present invention.

When "Yes" is selected (S53), the RF tag reader/writer changes the RF tag flag associated with the product container 17 in question stored in case RF tag 24 to "0," and the process stage position associated with the case is revised from the previous process stage position to the current (S54). The flow process then terminates. When "No" is selected (S55), the RF tag reader/writer removes data associated with the relevant container number from case RF tag 24, and revises the quantity of the product containers contained in case 35 from "n" to "n-l." Then, it changes the process stage position associated with the case from the previous process stage position to the current one (S56) and the flow process terminates. Needless to say, in the case that there are a plurality of product containers that are missing, operations after S52 in FIG. 12 are reiterated, although this process is not described in the flowchart of FIG. 12.

Even in the structure as described above in which data of case number, container numbers of the respective product containers, quantities, RF tag flags, etc. are stored in case RF tag 24 attached to the case 18, by zeroing the RF tag flag, the relevant product container 17 whose RF tag is disabled for reading can be moved between process stage positions in a state that that disabled product container 17 is contained in the case 18. Thus, even when reading from an RF tag is impaired, a wok time required in the production process management can be reduced.

As to a product container or containers 17 that do not exist in the case 18, since data associated with those product containers are removed from data stored in the case RF tag 24, the management for the rest of the product containers 17 thereafter can be continued without any problems. As to product container(s) 17 whose RF tag flag is changed to "0," since it is configured such that the relevant article management apparatus 3 informs the operator of the change by displaying it on the display 14 when the relevant article management apparatus 3 first reads from case RF tag 24 and article RF tag 20, the operator can easily find that product container carrying the reading-impaired article RF tag 20.

Besides, since a server is no longer required, the whole system structure can be simplified.

Numerous modifications and variations of the present invention are possible in light of the above teachings. It is therefore to be understood that, within the scope of the appended claims, the present invention can be practiced in a manner other than as specifically described therein.

What is claimed is:

1. An article management system, comprising:
   an article to which an article RF tag storing information pertaining to the article to be manufactured and a label recording information of the article are attached;
   a case containing a plurality of the articles,
   a case RF tag attached to the case for storing at least ID information of the case;
   a plurality of article management apparatus each disposed at a respective process stage position in a production line for reading information through an RF tag reader from the article RF tags attached to the articles within the case and the case RF tag attached to the case; and
   a server that is connected to the respective article management apparatus for managing ID information of the articles, a quantity of the articles, and a current process stage position that are stored in a database corresponding to each of the cases;
   wherein said article management apparatus, comprising:
   a display;
   a transmitting means for transmitting information read by the RF tag reader to said server,
   a display control means, when said article management apparatus receives from said server a notice on any of the articles whose tag has not been read from, for causing a reading-impairment instruction selection screen to be displayed on the display urging an operator to determine whether or not to inform to the sever of impairment of reading from said any of the article RF tags; and
   a reading-impairment notifying means, when the operator selects the reading-impairment instruction on the tag-impairment instruction selection screen, for notifying said server of the "impairment of reading" from said any of the article RF tags; and
   wherein said server, comprising:
   a collating means, when the server receives the information from said article managing apparatus that the RF tag reader has read, for collating information received from said article managing apparatus with information read from the database in respect to ID information of the articles, quantity, and process stage position corresponding to each of the cases;
   a transmitting means, when any of the articles whose RF tag is found not to have been read from as a result of the collation, for informing of said any of the articles as one whose tag has not been read from to said article management apparatus from which said server has received the relative information;
   a setting means, when said server receives the notification from said article management apparatus on the impairment of reading from said any of the articles, for setting for the "reading-impairment" by said RF tag reader/writer relating to an ID information of said any of the articles within the corresponding case.

2. An article management apparatus, comprising:
   an RF tag reader for reading information through an RF tag reader from article RF tags attached to articles within a case and a case RF tag attached to the case;
   a display;
   a transmitting means for transmitting information read by the RF tag reader to a server;
   a display control means, when said article management apparatus receives from the server a notice on any of the articles whose tag has not been read from, for causing a reading-impairment instruction selection screen to be displayed on said display urging an operator to determine whether or not to inform to the sever of impairment of reading relating to said any of the articles on which said article management apparatus receives from the server; and
   a reading-impairment notifying means, when the operator selects the reading-impairment instruction on the tag-impairment instruction selection screen, for notifying said server of the impairment of reading from said any of the articles.

3. An article management system, comprising:
   an article to which an article RF tag storing information pertaining to the article to be manufactured and a label recording information of the article are attached;
   a case containing a plurality of the articles,
   a case RF tag attached to the case for storing ID information of the case and managing ID information of the articles within the case, a quantity of the articles, and a current process stage position; and
   a plurality of article management apparatus each disposed at a respective process stage position in a production line for reading information through an RF tag reader/writer from the article RF tags attached to the articles within the case and the case RF tag attached to the case;
   wherein said article management apparatus, comprising:
   a display;
   a collating means for collating the information of the articles contained in the case with information including article ID information, quantity, and process stage position that are managed by the case RF tag, based on the information that has been read by the RF tag reader/writer;
   a display control means, when said article management apparatus finds any of the articles whose tag has not been read from, for causing a reading-impairment instruction selection screen to be displayed on the display over which an operator selects a reading-impairment instruction relating to said any of the articles; and
   a setting means, when the reading-impairment instruction has been selected over the reading-impairment instruction selection screen by an operator, for setting for the reading impairment by the RF tag reader/writer relating to an ID information of said any of the articles retained in the case RF tag.

4. An article management apparatus, comprising:
   an RF tag reader/writing for reading information through an RF tag reader from article RF tags attached to articles within a case and a case RF tag attached to the case;
   a display;
   a collating means for collating information of the articles contained in a case with information including article ID information, quantity, and process stage position that are managed by the case RF tag, based on the information that has been read by the RF tag reader/writer;
   a display control means that causes a reading-impairment instruction selection screen to be displayed on the display urging an-operator to determine whether or not to inform to the sever of impairment of reading from any of the articles RF tags, when said article management apparatus receives from said server a notice on any of the articles whose tag has not been read from; and a setting means for setting to the reading impairment by the RF tag reader/writer relating to an ID information of the relative article retained in the case RF tag, when reading impairment has been selected on the reading-impairment instruction selection screen by an operator.

* * * * *